United States Patent [19]

Miyano

[11] Patent Number: 5,800,104
[45] Date of Patent: Sep. 1, 1998

[54] LIQUID COOLANT/LUBRICANT RECOVERY SYSTEM FOR MACHINE TOOLS

[76] Inventor: Toshiharu Tom Miyano, 50 Dundee La., Barrington Hills, Lake County, Ill. 60010

[21] Appl. No.: 631,785

[22] Filed: Apr. 12, 1996

[51] Int. Cl.$^6$ .................. B23Q 11/00; B01D 21/00
[52] U.S. Cl. .................. 409/131; 29/DIG. 94; 82/901; 210/168; 408/56; 409/136; 409/137
[58] Field of Search .................. 409/137, 136, 409/131; 29/DIG. 28, DIG. 94, DIG. 63, DIG. 71; 408/56; 210/222, 703, 774, 168, 123, 171; 82/901

[56] References Cited

U.S. PATENT DOCUMENTS

| 1,917,831 | 7/1933 | Fairbairn | 409/137 X |
| 4,071,451 | 1/1978 | Wood | 210/168 X |
| 4,325,663 | 4/1982 | Lee | 409/136 |
| 4,498,987 | 2/1985 | Inaba | 210/222 |
| 4,751,006 | 6/1988 | Becker | 210/774 |
| 4,872,997 | 10/1989 | Becker | 210/703 |
| 5,099,729 | 3/1992 | Miyano | 29/DIG. 71 |
| 5,205,686 | 4/1993 | De Caussin | 409/131 |
| 5,217,613 | 6/1993 | Tashiro et al. | 210/396 |
| 5,230,793 | 7/1993 | Lenhart et al. | 409/137 |
| 5,380,446 | 1/1995 | Bratten | 409/137 X |

FOREIGN PATENT DOCUMENTS

| 5023947 | 2/1993 | Japan | 409/137 |
| 6218650 | 8/1994 | Japan | 409/137 |

*Primary Examiner*—William R. Briggs
*Attorney, Agent, or Firm*—Wood, Phillips, VanSanten, Clark & Mortimer

[57] ABSTRACT

A method of for performing a machining operation and recovering a liquid used in the machining operation. The method includes the steps of providing a machine tool to perform a machining operation, directing a liquid against at least one of a) a part of the machine tool and b) a workpiece on which the machining operation is being performed by the machine tool in such a manner that discrete particles become entrained in the liquid, directing at least a part of the liquid with the discrete particles entrained therein to a first location, and at the first location separating the liquid from the discrete particles.

9 Claims, 3 Drawing Sheets

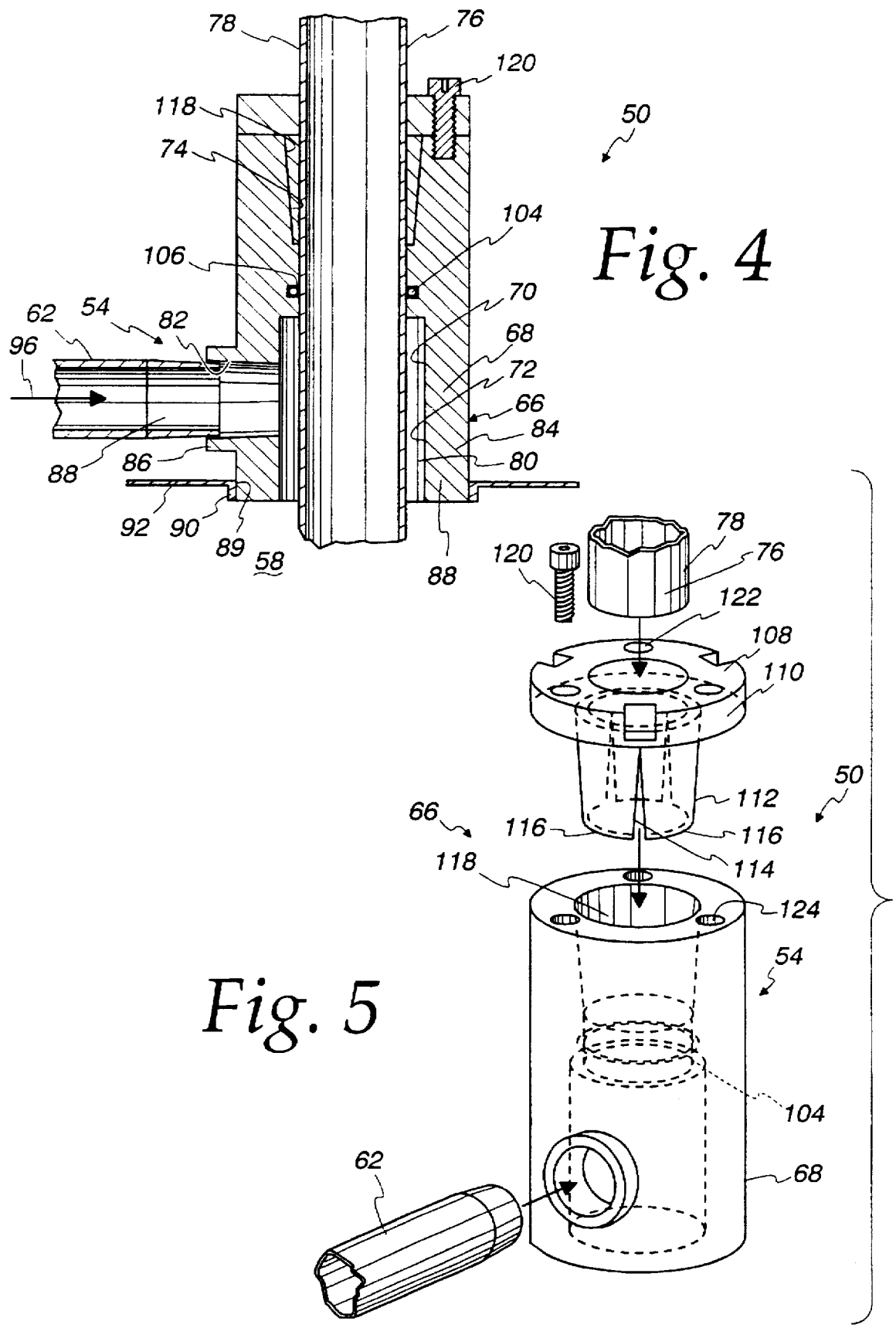

LIQUID COOLANT/LUBRICANT RECOVERY SYSTEM FOR MACHINE TOOLS

BACKGROUND OF THE INVENTION

1. Field of the Invention

This invention relates to machine tools which utilize a liquid coolant/lubricant during machining operations and, more particularly, to a method of recovering used coolant/lubricant and separating and accumulating solid machined particles entrained in the liquid for disposal thereof.

2. Background Art

It is well known to use liquid coolants and lubricants during machining operations. Coolants and lubricants enhance the performance of various tools and prevent overheating of both the workpiece and the tools during these operations.

Coolants and lubricants may be used in virtually every machining operation in which a tool removes particles or chips from a workpiece. During some machining operations, liquid under pressure may be continuously directed at part of the machine tool and/or the workpiece during the entire machining operation. As a result, bulk quantities of the coolant/lubricant are used. It is cost prohibitive and ecologically impractical to dispose of this liquid after a single use. Accordingly, many prior art machining systems recover this liquid for reuse.

In a typical system, a fluid collection trough is provided beneath the location where the machining operation takes place. The liquid that is discharged at the machine tool and/or workpiece accumulates in the collection trough. During the machining operation, discrete particles are removed from the workpieces and fall down towards the collection trough. In some prior art systems, a conveyor intercepts larger discrete particles and trimmings from the workpieces and conveys these particles to an appropriate disposal location. However, the smaller discrete particles migrate through the conveying system and become entrained in the liquid in the collection trough and define what is commonly referred to as "sludge". This is a thickened mixture of the coolant/lubricant liquid with small discrete particles that are removed from workpieces. If the sludge is allowed to stand undisturbed, the small particles, which are denser than the liquid, eventually fall under their own weight and accumulate, with the liquid above the accumulation of particles being relatively clear i.e. free of workpiece particles.

It is known to draw the clear liquid from above the accumulation of particles in the collection trough and to circulate this liquid back to against part of the machine tool and/or the workpiece as the machining operation continues. One problem associated with this type of system is that the small discrete workpiece particles continue to accumulate in the collection trough to the point that they must be removed. Consequently, this condition must be constantly monitored. Failure to extract the accumulated particles may result in a situation where the particles may interfere with the chip conveying structure or the basic components of the machine tool. At some point before this extreme condition occurs, the recirculating system may be drawing a significant amount of sludge out of the collection trough for recirculation. This may result in clogging of the filtering system or, in the absence of an effective filtering system, passage of particle-laden liquid to against the machine tool and/or workpiece, which could ultimately affect the machine tool operation.

Another problem with the conventional systems, described above, is that when the discrete particles and thick sludge are removed from the collection trough, this mixture must be disposed of. Since the liquid coolant/lubricant may contain toxic components, it is necessary to dispose of this material without violation of any disposal regulations or injury to the environment. In high volume operations, this disposal process may represent a significant expense.

SUMMARY OF THE INVENTION

It is one objective of the present invention to overcome one or more of the problems with the prior art, identified above.

In one form of the invention, a method is provided for performing a machining operation and recovering a liquid used in the machining operation. The method includes the steps of providing a machine tool to perform a machining operation, directing a liquid against at least one of a) a part of the machine tool and b) a workpiece on which the machining operation is being performed by the machine tool in such a manner that discrete particles become entrained in the liquid, directing at least a part of the liquid with the discrete particles entrained therein to a first location, and at the first location separating the liquid from the discrete particles.

The method may further include the step of directing at least a part of the liquid separated from the discrete particles against at least one of a) a part of a machine tool and b) a workpiece on which a machining operation is being performed by the machine tool.

According to the invention, a useable, solid product can be formed from the discrete particles from which the liquid is separated.

In one form, the step of separating the liquid from discrete particles involves directing the liquid with discrete particles entrained therein into a receptacle and allowing discrete particles that are denser than the liquid to move by gravity downwardly in the liquid in the receptacle.

The step of directing at least a part of the liquid separated from discrete particles may include the steps of providing a conduit with an inlet for conveying the liquid, situating the inlet of the conduit in the receptacle, and raising the inlet in the receptacle as the discrete particles accumulate in the receptacle.

The receptacle may be suitably closed once the accumulation of particles has reached a desired depth and replaced with another receptacle.

The liquid can be directed to the first location continuously as a machining operation is being performed. Similarly, direction of the part of the liquid separated from the discrete particles against the part of the machine tool and/or workpiece may also be carried out continuously as a machining operation is being performed.

The invention is also directed to a machining system including a machine tool for performing a machining operation on a workpiece, structure for collecting a liquid directed against at least one of a) part of the machine tool and b) a workpiece on which a machining operation is being performed by the machine tool, a receptacle in which liquid can be separated from discrete particles entrained in the liquid, and structure for directing liquid collected by the collecting structure to the receptacle.

The system may include structure for directing liquid from the receptacle back to the machine tool.

In one form, the machine tool has structure for directing liquid under pressure against at least one of a) a part of the machine tool and b) a workpiece on which a machining operation is being performed by the machine tool, and the structure for directing liquid back to the machine tool directs the liquid under pressure against a least one of a) a part of the machine tool and b) a workpiece on which a machining operation is being performed by the machine tool.

The structure for directing liquid to the receptacle may continuously direct liquid to the receptacle as a machining operation is being performed by the machine tool.

The structure for directing liquid back to the machine tool may continuously direct liquid back to the machine tool as a machining operation is being performed.

The system may further include structure for directing liquid separated from discrete particles away from the receptacle to a point of use. This structure may include a conduit for conveying liquid and having an inlet, and structure cooperating between the receptacle and conduit for selectively varying the location of the inlet within the receptacle.

In one form, the structure for directing liquid away from the receptacle includes a sleeve with a through bore in which the conduit is guided to thereby move relative to the receptacle, with the sleeve defining a passage separate from the through bore to communicate liquid from the collecting structure to the receptacle.

In one form, the receptacle is a drum with an open top and has a lid that can be used to selectively close the top.

The invention is further directed to a receptacle for separating a liquid from particles entrained in the liquid, which receptacle has a main body defining a liquid receiving and storing space, a sleeve, structure for attaching the sleeve to the main body, a conduit having an inlet, structure cooperating between the conduit and sleeve for guiding relative movement between the sleeve and main body to thereby vary the location of the inlet on the conduit in the receiving and storing space, and structure on the sleeve defining a communication path for liquid with discrete particles entrained therein from a location externally of the receptacle to within the liquid receiving and storing space without travelling through the conduit.

In one form, the communication path is bounded by the conduit.

BRIEF DESCRIPTION OF THE DRAWINGS

FIG. 4 is an enlarged, fragmentary, cross-sectional view of a sleeve, according to the present invention, for controlling introduction of sludge into the drum, and delivery of liquid separated out of the sludge in the receptacle/drum from the receptacle/drum;

FIG. 5 is an enlarged, exploded, perspective view of the sleeve of FIG. 4;

DETAILED DESCRIPTION OF THE DRAWINGS

Figure 1:
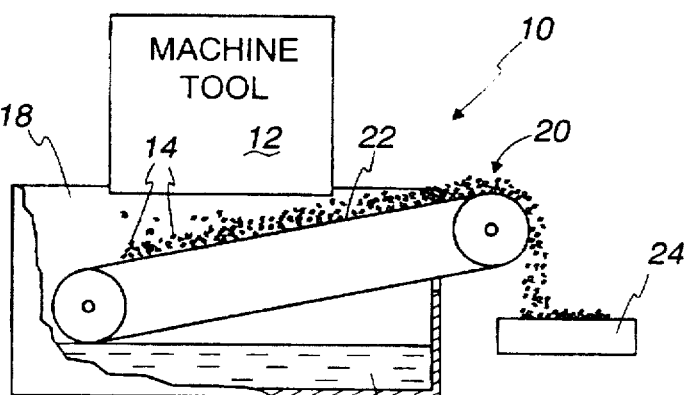
FIG. 1 is a schematic, side elevation view of a conventional machining system including a collection trough for a liquid coolant/lubricant used during machining operations and a conveying system for directing machined workpiece particles away from the collection trough.

In FIG. 1, a prior art machining system is shown schematically at 10. The machining system 10 includes a machine tool 12. The machine tool 12 is shown generically to encompass any type of machine tool that operates on a workpiece to thereby separate discrete particles 14 from the workpiece during a machining operation.

During a machining operation, it is conventional to deliver a supply of liquid coolant/lubricant 16 under pressure against a part of the machine tool and/or a workpiece being operated upon by the machine tool 12. The discharged liquid coolant/lubricant 16 accumulates in a collection trough 18 defined beneath the machine tool 12. The larger particles 14 that are removed from the workpiece are intercepted by a conveying system 20 with a porous conveying belt 22, which allows the smaller discrete particles 14 and the liquid coolant/lubricant 16 to pass therethrough and be accumulated in the collection trough 18. The larger discrete particles 14 are moved by the conveying system 20 away from the machine tool 12 to an appropriate bin 24 for collection thereat.

Figure 2:
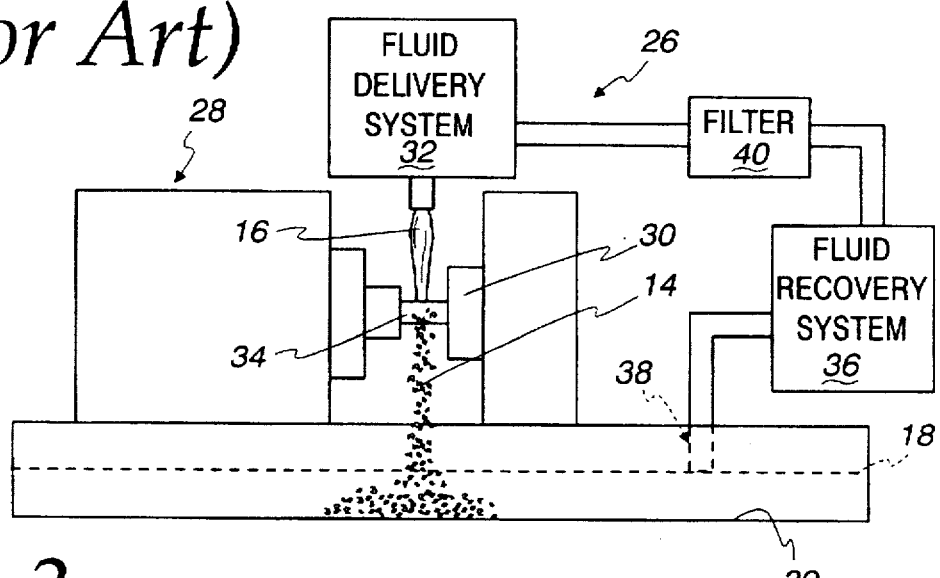
FIG. 2 is a schematic, side elevation view of a prior art machining system including a system for recirculating liquid coolant/lubricant.

In FIG. 2, a prior art machining system is shown schematically at 26 and includes a machine tool 28 for operating on a workpiece 30. A fluid delivery system 32 propels liquid coolant/lubricant 16 against a working tool 34 and a workpiece 30 as it is operated upon by the working tool 34. The liquid 16 and discrete workpiece particles 14 removed from the workpiece 30 during the machining operation accumulate in the collection trough 18.

The machining system 26 has a fluid recovery system 36 which draws liquid coolant/lubricant 16 from a location 38 above the bottom 39 of the collection trough 18. This type of recovery system 36 relies on the fact that the majority of the discrete particles 14 will have a higher density than that of the liquid coolant/lubricant 16 and will, as a result, fall under their own weight towards the bottom 39 of the collection trough 18, and accumulate thereat. As a result, the liquid 16 drawn at the location 38 will be relatively free of discrete particles 14. The fluid recovery system 36 directs the liquid coolant/lubricant 16 drawn from the collection trough 18 through a filter 40 into the fluid delivery system 32 so that the liquid coolant/lubricant 16 can be redirected at the machine tool 28 and workpiece 30.

The problems with the systems shown in FIGS. 1 and 2 are described in the Background Art section, above.

The present invention is described with respect to FIGS. 3–8. Referring initially to FIGS. 3–7, the inventive machining system is shown at 50. The machining system 50 is made up of a machine tool 52 and a fluid recovery system at 54. The machine tool 52 is again shown schematically in FIG. 3 to be a generic representation of any type of machine tool that operates on a workpiece in such a manner that discrete particles on the workpiece are removed during the machining operation.

A collection trough 56 is provided beneath the machine tool 52 and is designed to accumulate liquid coolant/lubricant 16 directed against a part of the machine tool 52 and/or a workpiece operated upon by the machine tool 52 during a machining operation in the same manner as shown in FIGS. 1 and 2. A screen or a conveying system, such as that shown in 20 in FIG. 1, can be incorporated into the system 50 to intercept large discrete particles that are separated from a workpiece during the machining operation.

According to the invention, a receptacle, in this case shown in the form of a drum 58, is provided at a location spaced from the machine tool 52. A pump 60 directs sludge, made up of discrete particles 14 entrained in the liquid coolant/lubricant 16, from the bottom of the collection trough 56 through a conduit 62 to a receiving and storage space 64 within the receptacle 58.

More particularly, the conduit 62 communicates through a sleeve/fitting 66 with the space 64. The sleeve/fitting 66 has a cylindrical body 68 with a stepped through bore 70. The bore 70 has a large diameter portion 72 and a small diameter portion 74. The small diameter portion 74 closely accepts the outer surface 76 of a discharge conduit 78, as described in detail hereafter. The large diameter portion 72 of the bore 70 and outer surface 76 of the conduit 78 cooperatively define an annular chamber 80. A bore 82 through the side wall 84 of the body 68 is in fluid communication with the chamber 80. A thickened flange 86 surrounds the bore 82 and defines a seating surface for a tapered end 88 of the conduit 62.

The lower end 88 of the sleeve/fitting 66 is press fit into a through bore 89 in a thickened portion 90 of a lid 92 at the open upper end 94 of the receptacle 58. With the sleeve/fitting 66 in the operative position of FIG. 4, the sludge pumped from the trough 56 is allowed to flow in the direction of the arrow 96 through the conduit 62, through the chamber 80, and into the receiving and storing space 64 in the receptacle 58.

In the receptacle 58, the particles 14 in the sludge fall by their own weight to the bottom of the receiving and storage space 64 and accumulate thereat. As this occurs, the liquid 16 becomes separated therefrom. This relatively clean fluid 16 is then drawn by a pump 96 through the conduit 78 and delivered to a conduit 98 and to the fluid delivery system 58, which may include a suitable filter to block passage of any remaining particles 14.

According to the invention, the conduit 78 is slidable vertically within the conduit 98 and sleeve/fitting 66 relative to the receptacle 58 so that an inlet 100, at the bottom end of the conduit 78, can be situated above the accumulation 102 of particles 14 separated in the receptacle 58. With this arrangement, the user can periodically raise the conduit 78 so that the inlet 100 draws relatively clean liquid 16 from the receptacle 58 above the accumulated discrete particles 14.

As previously noted, the outer surface 76 of the conduit 78 is guided within the small diameter portion 74 of the through bore 70. To prevent passage of liquid between the conduit 78 and sleeve/fitting 66, an O-ring 104 is located in an undercut 106 on the body 68. The O-ring 104 sweeps the outer conduit surface 76 as the conduit 78 is raised relative to the receptacle 58.

The conduit 78 can be fixed in any desired position by a collet 108 having a disk-shaped flange 110, from which a tapered sleeve 112 depends. The sleeve 112 has slots 114 therethrough which define tabs 116. The sleeve 112 is received within a correspondingly tapered seat 118 at the top of the body 68. Bolts 120 extend through bores 122 in the flange 110 and into threaded, blind bores 124 extending axially into the side wall 84 of the sleeve/fitting 66. As the bolts 120 are tightened, the tabs 116 produce a progressively increasing captive force on the outer surface 76 of the conduit 78. With the collet 108 loosened, the conduit 78 can be slid vertically to situate the inlet 100 at a desired vertical location within the receptacle 58 i.e. preferably above the top of the accumulation 102 of the particles 14 therein.

To begin operation, the user first sets the conduit 78 so that the inlet 100 thereon is situated towards the bottom of the receiving and storage space 64 in the receptacle 58. Pumps 90, 96 are then operated to continuously circulate liquid from the collection trough 56 to the fluid delivery system 58 through the receptacle 58, in which the discrete particles 14 are allowed to separate from the liquid coolant/lubricant 16. An air vent 126 in the lid 92 on the receptacle 58 assures the free flow of liquid to and from the receptacle 58. As the liquid 16 circulates, there is a progressive buildup of particles 14 in the receptacle 58. As this occurs, the user periodically loosens the collet 108 and raises the conduit 78 so that the inlet 100 thereon is in relatively clean liquid 16, i.e. not embedded in an accumulation of the particles 14 in the receptacle 58.

Figure 3:
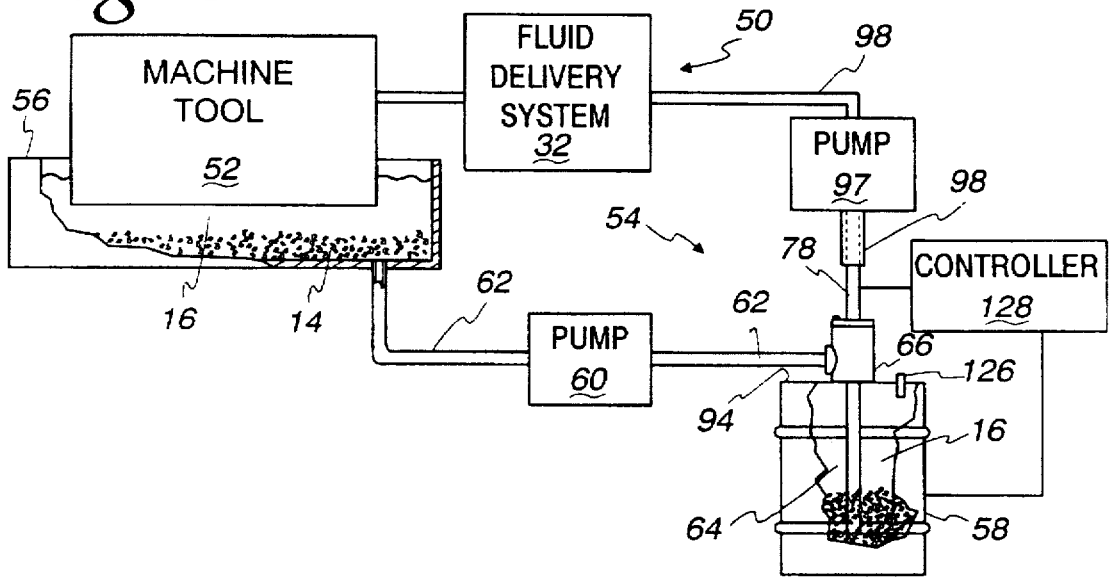
FIG. 3 is a schematic, side elevation view of a machining system, according to the present invention, and including a receptacle/drum into which sludge is directed to allow separation of discrete particles from a liquid coolant/lubricant in which the discrete particles are entrained in the sludge.
Figure 6:
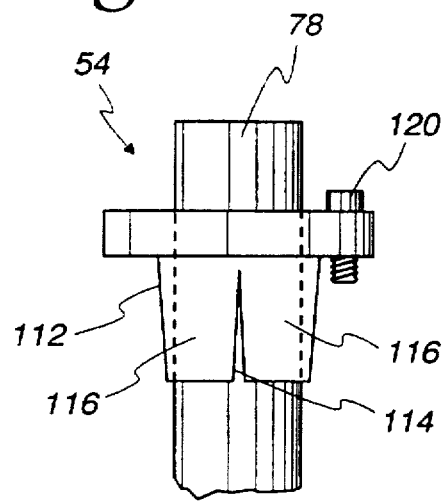
FIG. 6 is an enlarged, fragmentary, side elevation view of the top of the sleeve of FIGS. 4 and 5.

In a more sophisticated version of the system, as shown in FIG. 3, a controller 128 can be provided to sense the quantity of discrete particles 14 within the receptacle, as by weight, and to thereby automatically change the vertical position of the conduit 78 to situate the inlet above the particle accumulation. This can be done without fixing the conduit 78, as to the collet 108.

Figure 7:
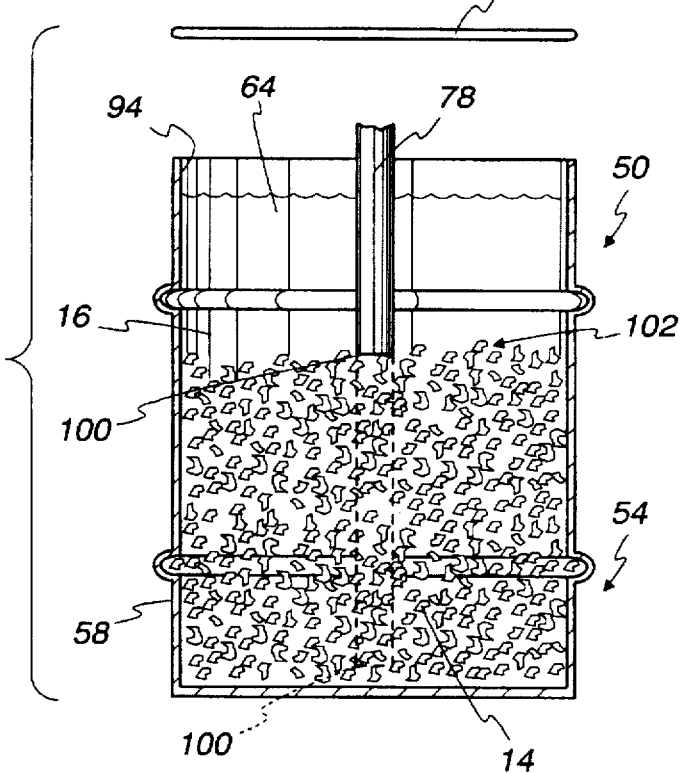
FIG. 7 is a cross-sectional view of the receptacle/drum in FIG. 3 with a removable lid separated therefrom and with a conduit for conveying liquid from within the receptacle/drum in two different positions.

When the receptacle 58 is filled to a predetermined height with discrete particles 14, the receptacle 58 is replaced with a like, but empty, receptacle 58. To accomplish this, the user removes the lid 92 with the sleeve/fitting 66 thereon and substitutes a solid lid 130, as shown in FIG. 7, to seal the upper end 94 of the receptacle 58. The substitute receptacle 58 is hooked up and functions in the same manner as previously described.

Figure 8:
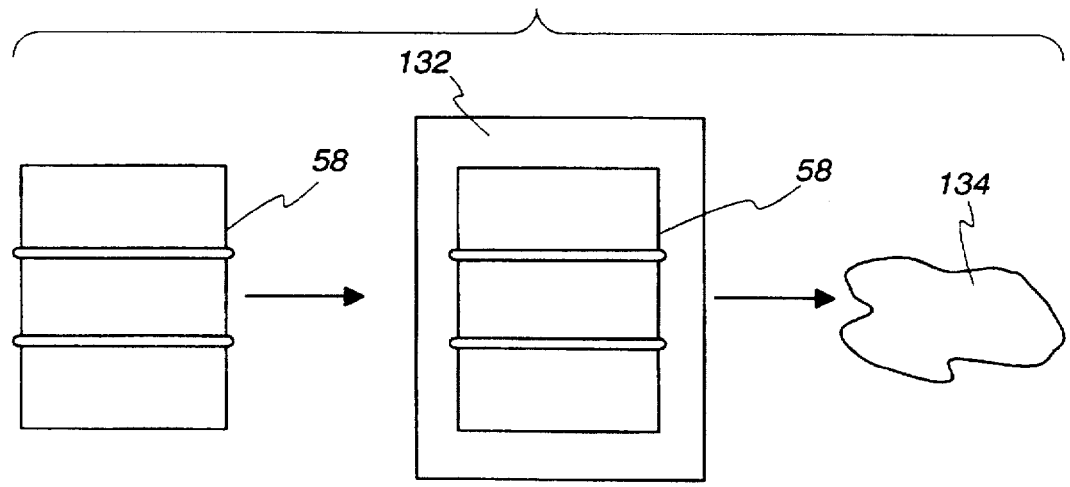
FIG. 8 is a schematic representation of the steps used to convert the receptacle/drum filled with discrete particles into a solid, useable object having a different configuration.

The receptacle 58 that is full and sealed can then be transported to a dump site. Alternatively, the invention contemplates that the receptacle 58 and its contents i.e. discrete particles 14, can be converted to another state. As shown in FIG. 8, the receptacle 58 with the accumulated discrete particles 14 can be directed into a furnace 132 and melted to be thereafter converted to another useable, solid form, as shown schematically at 134. Since the majority of the discrete particles 14 will be metal, the melted mass can be converted into a ballast material, such as used in a counterbalance in heavy machinery. Rather than having to dispose of this material, the user of the machine tool can sell the sealed drums with the discrete particles therein for this purpose or other appropriate use.

The foregoing disclosure of specific embodiments is intended to be illustrative of the broad concepts comprehended by the invention.

I claim:

1. A method of performing a machining operation and recovering a liquid used in the machining operation, said method comprising the steps of:

providing a machine tool to perform a machining operation;

providing at a first location a first receptacle having a storing space with a top and bottom;

directing a liquid against at least one of a) a part of the machine tool and b) a workpiece on which the machining operation is being performed by the machine tool in such a manner that discrete particles become entrained in the liquid;

directing at least a part of the liquid with the discrete particles entrained therein into the receptacle storing space;

allowing discrete particles that are denser than the liquid to move under gravitational force and progressively accumulate at the bottom of the receptacle storing space;

providing a return path from said receptacle to said machine tool so that liquid from above the accumulated discrete particles in the receptacle storing space is directed against at least one of a) a part of the machine tool and b) a workpiece on which a machining operation is being performed by the machine tool until the accumulated discrete particles in the receptacle storing space accumulate to a predetermined height in the receptacle storing space;

moving the receptacle with the discrete particles therein accumulated to the predetermined height from the first location to a point of use; and providing at the first location a second receptacle having a storing space with a top and bottom and directing at least part of the liquid with the discrete particles entrained therein into the second receptacle to cause progressive accumulation of discrete particles at the bottom of the storing space in the second receptacle.

2. The method of performing a machining operation and recovering a liquid used in the machining operation according to claim 1 including the step of directing at least a part of the liquid separated from discrete particles in the receptacle against at least one of a) a part of the machine tool and b) a workpiece on which a machining operation is being performed by the machine tool.

3. A method of performing a machining operation and recovering a liquid used in the machining operation, said method comprising the steps of:

providing a machine tool to perform a machining operation;

directing a liquid against at least one of a) a part of the machine tool and b) a workpiece on which the machining operation is being performed by the machine tool in such a manner that discrete particles become entrained in the liquid;

directing at least a part of the liquid with the discrete particles entrained therein to a first location;

at the first location separating the liquid from discrete particles;

wherein the step of separating the liquid from discrete particles comprises the steps of directing the liquid with discrete parties entrained therein into a receptacle and allowing discrete particles that are denser than the liquid to move by gravity downwardly in the liquid in the receptacle; and directing at least a part of the liquid separated from discrete particles in the receptacle against at least one of a) a part of the machine tool and b) a workpiece on which a machining operation is being performed by the machine tool, wherein the step of directing at least a part of the liquid separated from discrete particles comprises the steps of providing a conduit with an inlet for conveying the liquid, situating the inlet of the conduit in the receptacle, and raising the inlet in the receptacle as the discrete particles accumulate in the receptacle.

4. The method of performing a machining operation and recovering a liquid used in the machining operation according to claim 3 including the steps of closing the receptacle once the discrete particles are accumulated to a desired depth and replacing the receptacle with another receptacle.

5. The method of performing a machining operation and recovering a liquid used in the machining operation according to claim 1 wherein the step of directing at least a part of the liquid into the receptacle storing space of the first receptacle comprises the step of continuously directing at least a part of the liquid into the receptacle storing space of the first receptacle as the machining operation is being performed.

6. The method of performing a machining operation and recovering a a liquid used in the machining operation according to claim 5 wherein the step of directing at least a part of the liquid separated from discrete particles comprises the step of continuously directing at least a part of the liquid separated from discrete particles against at least one of a) a part of the machine tool and b) a workpiece on which a machining operation is being performed by the machine tool as the machining operation is being performed.

7. A machining system comprising:

a machine tool for performing a machining operation on a workpiece, means for collecting a liquid directed against at least one of a) a part of the machine tool and b) a workpiece on which a machining operation is being performed by the machine tool;

a receptacle in which liquid can be separated from discrete particles entrained in the liquid;

means for directing liquid collected by the collecting means to the receptacle; and means for directing liquid separated from discrete particles away from the receptacle to a point of use, wherein the means for directing liquid away from the receptacle comprises a conduit for conveying liquid and having an inlet and means cooperating between the receptacle and conduit for selectively varying the location of the inlet within the receptacle.

8. The machining system according to claim 7 wherein the means for directing liquid away from the receptacle comprises a sleeve with a through bore in which the conduit is guided to thereby move relative to the receptacle and the sleeve defines a passage separate from the through bore to communicate liquid from the collecting means to the receptacle.

9. The machining system according to claim 7 wherein the receptacle comprises a drum with an open top and a lid that can be used to selectively close the top.

* * * * *